United States Patent
Bier et al.

(10) Patent No.: US 11,385,132 B2
(45) Date of Patent: Jul. 12, 2022

(54) TEST RUN METHOD AND TEST STAND

(71) Applicant: AVL LIST GMBH, Graz (AT)

(72) Inventors: Maximilian Bier, Darmstadt (DE); Martin Schmidt, Langen (DE)

(73) Assignee: AVL List GmbH, Graz (AT)

( * ) Notice: Subject to any disclaimer, the term of this patent is extended or adjusted under 35 U.S.C. 154(b) by 83 days.

(21) Appl. No.: 16/956,487

(22) PCT Filed: Dec. 21, 2018

(86) PCT No.: PCT/EP2018/086512
§ 371 (c)(1),
(2) Date: Jun. 19, 2020

(87) PCT Pub. No.: WO2019/122305
PCT Pub. Date: Jun. 27, 2019

(65) Prior Publication Data
US 2021/0096040 A1    Apr. 1, 2021

(30) Foreign Application Priority Data
Dec. 22, 2017 (AT) ................. A51074/2017

(51) Int. Cl.
*G01M 15/02* (2006.01)
*G01M 15/08* (2006.01)

(52) U.S. Cl.
CPC ............ *G01M 15/02* (2013.01); *G01M 15/08* (2013.01)

(58) Field of Classification Search
CPC ..................... G01M 15/02; G01M 15/08
See application file for complete search history.

(56) References Cited

U.S. PATENT DOCUMENTS 7,770,440 B2 * 8/2010 Langthaler .......... G01M 13/025
                                                            73/115.05
8,281,653 B2 * 10/2012 Schrotter ............ G01M 15/044
                                                            73/116.02
(Continued)

FOREIGN PATENT DOCUMENTS

| AT | 508909 B1 | 5/2011 |
| EP | 3067681 A1 | 9/2016 |
| JP | 2006300684 A | 11/2006 |

OTHER PUBLICATIONS

M Nomura et al: "Decoupling torque control system for automotive engine tester", IEEE Transactions on Industry Applications, Mar. 1, 2000 (Mar. 1, 2000), New York, pp. 467-474.
(Continued)

*Primary Examiner* — Eric S. McCall
(74) *Attorney, Agent, or Firm* — Dykema Gossett PLLC

(57) ABSTRACT

Aspects of the present disclosure are directed to a method for controlling the torque of a drive unit on a test stand. Accordingly, one embodiment of the present disclosure is a method for controlling an inner effective torque of the drive unit via a unit controlling unit, wherein an inner effective desired torque is determined from the given courses of the rotational speed and the torque of the drive unit and a known mass inertia of the drive unit, and an inner effective actual torque is determined during the operation of the drive unit on the test stand from measured values of the load machine and/or of the drive unit and/or of the connecting shaft and/or of a known mass inertia of the drive unit.

24 Claims, 7 Drawing Sheets

(56) References Cited

U.S. PATENT DOCUMENTS

| | | | | |
|---|---|---|---|---|
| 2008/0190183 A1* | 8/2008 | Erlach | ............... | G01M 15/044 73/114.01 |
| 2009/0100919 A1* | 4/2009 | Sugita | ............... | G01M 15/044 73/114.15 |
| 2011/0011169 A1* | 1/2011 | Schrotter | ......... | G01M 15/044 73/116.02 |
| 2011/0041595 A1* | 2/2011 | Dank | ................. | G01M 15/02 73/116.06 |
| 2018/0143101 A1* | 5/2018 | Pfister | ............ | G01M 17/0074 |
| 2019/0310162 A1* | 10/2019 | Pfeiffer | ............ | G01M 13/025 |
| 2019/0383703 A1* | 12/2019 | Kokal | ............... | G01M 15/12 |
| 2020/0333201 A1* | 10/2020 | Vadamalu | ............ | G01L 3/02 |
| 2020/0348209 A1* | 11/2020 | Pfister | ............... | G01M 15/04 |
| 2021/0063277 A1* | 3/2021 | Vadamalu | ......... | G01M 15/042 |
| 2021/0088410 A1* | 3/2021 | Bier | .................. | G01M 15/05 |

OTHER PUBLICATIONS

Gruenbacher E., et al., "Adaptive Control of Engine Torque with Input Delay", IFAC Proceedings vol. 41, Issue 2 (2008).

\* cited by examiner

TEST RUN METHOD AND TEST STAND

CROSS-REFERENCE TO RELATED APPLICATIONS

This application is a national stage filing based upon International PCT Application No. PCT/EP2018/086512, filed 21 Dec. 2018, which claims the benefit of priority to Austria application No. A 51074/2017, filed 22 Dec. 2017.

BACKGROUND

The present invention relates to a method for performing a test run on a test stand with a drive unit, which is connected by means of a connecting shaft to a load machine for driving or loading the drive unit, wherein the load machine is controlled by a control device on the test stand for carrying out the test run and the drive unit is controlled by a unit controlling unit for carrying out the test run, wherein given time courses of a rotational speed and a torque of the drive unit are reproduced. The invention further relates to a test stand for performing a test run.

For many years, test stands have been used in the development of drive units, such as internal combustion engines, electric motors, or a combination of internal combustion engine and electric motor (so-called hybrid drives), the basic structure and mode of operation of which are well known. It has always been a substantial requirement of such test stands to ensure the most accurate and reproducible replication of given rotational speed/torque profiles on the output shaft of the drive unit. For this purpose, the drive unit is connected to a load machine (dynamometer, dyno) via a connecting shaft.

As a rule, the rotational speed is set on the test stand via the load machine and the torque via the drive unit. Due to the limited availability of drive and measurement technology or control and control devices, it was initially possible to set and measure primarily stationary operating points (rotational speed/torque combination). For many test runs, it was also sufficient to only go to stationary operating points. Due to increasing requirements for drive units (e.g. high engine output, low consumption, low pollutant emissions in internal combustion engines) and progressive development in the technical areas mentioned, but also due to increasing requirements and specifications for testing drive units, it became possible or necessary on the test stands not only to set stationary operating points, but also dynamic rotational speed/torque courses.

"Dynamic" here means not only stationary operating points, but also, above all, rapid changes in rotational speed and/or torque. These profiles can be, for example, legally prescribed measurement cycles for the exhaust gas certification of internal combustion engines in order to provide evidence of compliance with limit values for pollutant emissions. In order to optimize the performance and consumption of drive units, however, high-dynamic, non-standardized driving profiles measured during a test drive on the road, or on a test track with a vehicle in real life are being used more and more, for example when using the drive unit as a vehicle drive. These dynamic profiles place very high demands on the control of test stands, which cannot always be adequately met.

Usually, the so-called control method $N/M_{EFF}$ is used on the test stand, wherein the load machine of the test stand controls the rotational speed $N_M$ of the drive unit given on the basis of a target profile and the drive unit controls the given effective torque $M_{EFF}$ on the connecting shaft between the load machine and the drive unit. However, these two variables $N_M$ and $M_{EFF}$ are strongly coupled to one another via the mass inertia of the drive unit. The manipulated variable of the drive unit in the case of an internal combustion engine is, for example, the accelerator pedal position $\alpha$, which has a direct effect on the inner effective torque $M_{INT\_EFF}$, that is to say that torque which acts directly on the mass inertia of the internal combustion engine. During acceleration and braking processes, the effective torque $M_{EFF}$ on the connecting shaft results from a superimposition of the inner effective torque $M_{INT\_EFF}$ and that torque which is necessary for the acceleration or braking of the mass inertia of the internal combustion engine to change the rotational speed.

However, the inner effective torque $M_{INT\_EFF}$ cannot be measured directly, which is why the measurable torque $M_{EFF}$ on the connecting shaft has always been controlled. In dynamic test runs in particular, however, it is not possible to control the effective torque $M_{EFF}$ on the connecting shaft independently of the rotational speed N. The manipulated variable of the drive unit (in the case of the internal combustion engine, for example, the accelerator pedal position $\alpha$) is often determined from an existing static characteristic map (measured stationary operating points) with the rotational speed $N_M$ and the effective torque $M_{EFF}$ as inputs. Such a characteristic map-based "feed-forward" control leads to incorrect values of the manipulated variable since the measured value of the effective torque $M_{EFF}$ on the connecting shaft in an operating point during dynamic test cycles does not match the value in the corresponding operating point during stationary operation.

In addition, the actuating dynamics of a drive unit is generally significantly lower than that of an ordinary test stand load machine. As a result, the torque of the internal combustion engine is delayed in relation to the rotational speed of the load machine. Actuating dynamics is understood here to mean how quickly a change in the manipulated variable influences the torque. Using the example of an internal combustion engine, a change in the accelerator pedal position does not have an immediate effect on the torque, but usually only after a specific time, often in the range of a few seconds. These are the main reasons why the previous control of a test run on the test stand in dynamic test runs sometimes delivers poor results.

In the publication GRUENBACHER, E. et. al., 2008. Adaptive Control of Engine Torque with Input Delays. In: 17th World Congress of the International Federation of Automatic Control. Seoul, Korea, Jul. 6-11, 2008, it is recommended to control the inner torque due to combustion during test runs on engine test stands, but it is stated that this is difficult in practice because the inner torque is a superimposition of the individual expansion strokes during combustion in the cylinders of the internal combustion engine. In addition, this inner torque cannot be measured directly and must be estimated. Furthermore, test runs with dynamic speed courses are not considered in this publication.

EP 3 067 681 A1 describes a method for operating an engine or drive train test stand, wherein an indication device is used to record the combustion chamber pressure. The combustion chamber pressure is converted to an indicated torque and furthermore to an effective torque of the crankshaft, which is used to control the load machine. A disadvantage of this method, however, is that the combustion chambers of the internal combustion engine have to be made accessible by means of mechanical processing for the cylinder pressure measurement, and the measurement method is very complex and cost-intensive.

Accordingly, it is the object of the invention to provide an easy-to-use and improved method in comparison with the prior art for controlling the torque of a drive unit for carrying out a test run on a test stand.

SUMMARY OF THE INVENTION

According to the invention, an inner effective torque of the drive unit is controlled by the unit controlling unit, wherein an inner effective desired torque is determined from the given courses of the rotational speed and the torque of the drive unit and a known mass inertia of the drive unit, and an inner effective actual torque is determined during the operation of the drive unit on the test stand from measured values of the load machine and/or of the drive unit and/or of the connecting shaft, and/or a known mass inertia of the drive unit.

In contrast to conventional methods, the effective torque of the drive unit, which is usually measured on the connecting shaft between the drive unit and the load machine, is not used to control the torque of the drive unit, but rather the so-called inner effective torque, which is a corrected torque, in which acceleration influences of the mass inertia of the drive unit compared to the effective torque are corrected. This substantially allows the rotational speed and torque to be decoupled on the test stand, which means that the effective torque can be better controlled.

In contrast to the effective actual torque on the connecting shaft, the inner effective actual torque cannot be measured directly, but it can be determined, for example, using an observer. All known algorithms can be used as observers, which determine a value of the inner effective torque that is independent of acceleration influences of the mass inertia.

The inner effective actual torque is preferably determined from an actual rotational speed measured on one of the load machine or the drive unit, or the connecting shaft, and an effective actual torque measured on one of the load machine or the drive unit, or the connecting shaft, and the known mass inertia of the drive unit. For this purpose, the time derivative of the measured actual rotational speed can be multiplied by the known mass inertia of the drive unit, and the product can be added to the measured effective actual torque.

If an internal combustion engine is used as the drive unit, the inner effective actual torque can be determined by means of cylinder pressure indication on the internal combustion engine. For this purpose, the inner effective actual torque is preferably determined from the difference between an indicated actual torque and a friction torque, the indicated actual torque being determined by means of the cylinder pressure indication.

The inner effective desired torque can be determined from the predetermined course of the rotational speed of the drive unit, the predetermined course of the torque of the drive unit and from the known mass inertia of the drive unit by deriving the course of the predetermined rotational speed over time and multiplying with the known mass inertia of the drive unit, and adding the product to the given course of the torque of the drive unit. The given courses can be determined, for example, from recorded measurement data of the drive unit, from measurement cycles prescribed by law, or from other sources. The mass inertia is—depending on the development goal—selected according to the mass inertia of a drive unit of a reference operation or according to the mass inertia of the drive unit to be tested and is assumed to be known. Likewise, the desired value of the inner effective torque could, for example, be determined from recorded data of a unit control device (for example ECU of an internal combustion engine).

Advantageously, a feed forward control of a manipulated variable of the drive unit is used to control the drive unit, with precontrol values of the manipulated variable preferably being determined from a reference test run of the drive unit or a reference drive unit. The accelerator pedal position is particularly preferably used as the manipulated variable of the feed forward control. The precontrol values can be determined from the inner effective desired torque and from a rotational speed, in particular the actual rotational speed or the given rotational speed, preferably from a characteristic map. This improves the control since the unit controlling unit only has to adjust minor deviations.

According to a further advantageous embodiment of the invention, the actuating dynamics of the drive unit are taken into account when controlling it by means of a transfer function by correcting desired values of the control or the precontrol values of the manipulated variable by means of the transfer function. As a result, different delays in the build-up of the inner effective torque of different drive units can be compensated for, thereby resulting in improved control accuracy.

In the simplest case, the desired values can be corrected by shifting the desired values or the precontrol values of the manipulated variable by a dead time on the time axis. The dead time can be set to be the same for all operating points of the drive unit or can be defined depending on the operating point of the drive unit. This allows the different dynamics in the build-up of the inner effective torque to be compensated for different operating points, which further improves the control accuracy.

The consideration of different operating points can be achieved in that the dead time for an operating point of the drive unit is determined depending on the gradient of the course of the inner effective desired torque in this operating point. By analyzing the course of the inner effective desired torque, no additional measurement effort is required. This makes it possible, for example, to take into account the different mass inertial behavior of the drive unit over time when the torque rises and falls.

The dead time can also be determined by measuring the drive unit or a reference drive unit on the test stand, preferably by suddenly changing the manipulated variable of the drive unit and measuring the time between the sudden change in the manipulated variable and a change in the inner effective actual torque caused thereby. It would be conceivable, for example, to create dead time characteristic maps for drive units with a similar expected actuating dynamics range, for example depending on the displacement, supercharging, number of cylinders, nominal rotational speed, etc.

BRIEF DESCRIPTION OF THE DRAWINGS

The present invention is described in greater detail in the following with reference to FIGS. 1 to 7, which show advantageous embodiments of the invention by way of example, schematically and in a non-limiting manner. In the figures.

DETAILED DESCRIPTION

Figure 1:
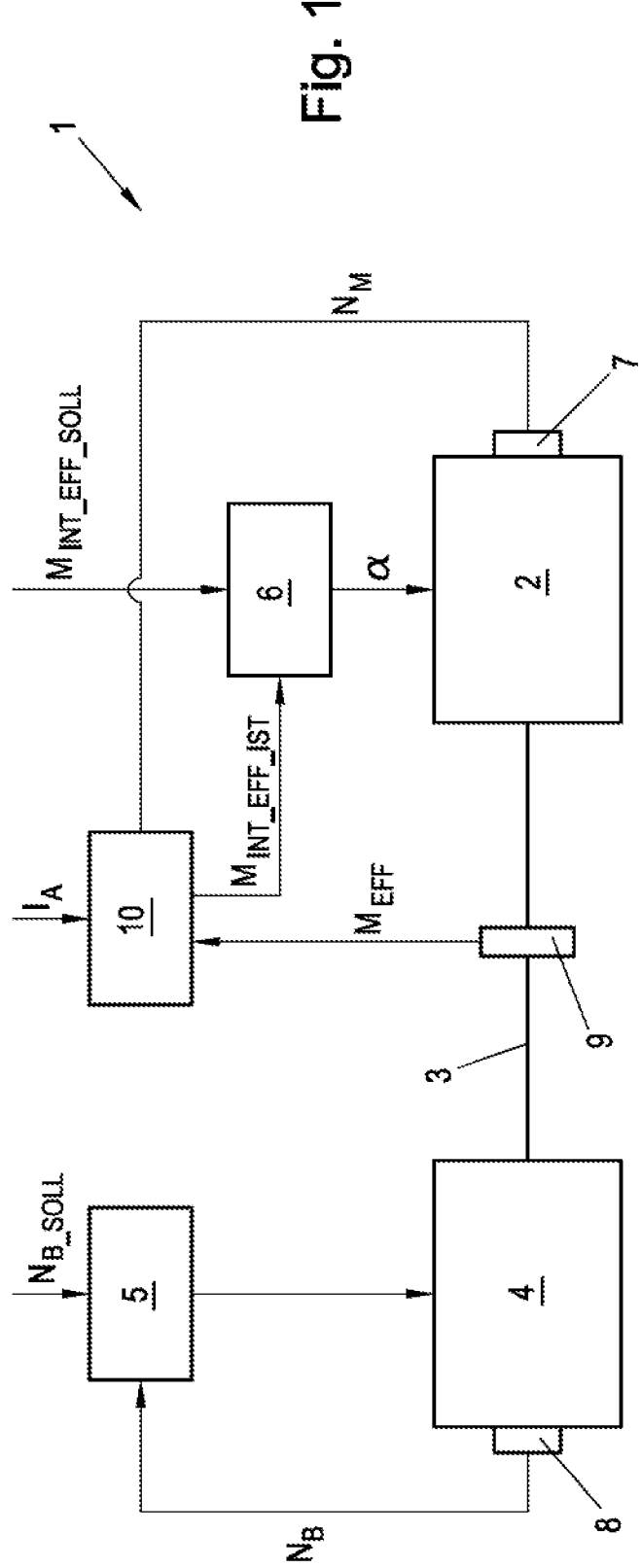
FIG. 1 shows the general structure of a test stand

FIG. 1 shows a known, conventional structure of a test stand 1 having a drive unit 2, which is connected to a load machine 4 by means of a connecting shaft 3 for torque transmission, having a control device 5 for controlling the load machine 4 and having a unit controlling unit 6 for controlling the drive unit 2. The control device 5 and the unit controlling unit 6 can be implemented with suitable hardware and/or software (also on common hardware). The drive unit 2 has a rotational speed measuring device 7 for measuring the unit rotational speed $N_M$ and the load machine 4 also has a rotational speed measuring device 8 for measuring the load machine rotational speed $N_B$. A torque measuring device 9 for measuring the effective torque $M_{EFF}$ of the drive unit 2 is arranged on the connecting shaft 3 between the drive unit 2 and the load machine 4.

A load machine 4 is not only to be understood as the usual electrical machines, such as, for example, direct current machines, asynchronous machines or three-phase synchronous machines, which are connected directly to the connecting shaft 3, but also, for example, combinations of electrical machines and gears, for example in the form of so-called test rig transmission systems (TRT). In this case, for example, two or more electrical machines can be connected by means of a summation gearbox, which in turn is connected to the connecting shaft 3 for driving or for loading with the drive unit 2. The powers of the two (or a plurality of) electrical machines are added together in the summation gearbox, wherein a translation to a specific rotational speed level is also possible, if necessary. Of course, this is only an example; all other suitable machines or combinations of machines and transmissions can also be used as the load machine 4.

To determine the inner effective actual torque $M_{INT\_EFF\_IST}$ of the drive unit 2, an observer 10 can be provided, for example, which is again designed as suitable hardware and/or software. All known algorithms can be used as the observer 10, which determine a torque, in which acceleration influences of the mass inertia $I_A$ of the drive unit 2 have been corrected and which, according to the invention, is used as the inner effective actual torque $M_{INT\_EFF\_IST}$. The function of such an observer 10 is known in principle, but its basic functioning is to be explained briefly below with reference to FIG. 2 for the sake of completeness.

If the drive unit 2 is designed as an internal combustion engine, a cylinder pressure indication system can be used alternatively to an observer 10 to determine the inner effective actual torque $M_{INT\_EFF\_IST}$. The cylinder pressure in the combustion chamber of the internal combustion engine can thus be measured with an exact crank angle and, based on the measured cylinder pressure, an indicated actual torque $M_{INT\_IST}$ can be determined by means of thermodynamic laws. If this indicated actual torque $M_{INT\_IST}$ is corrected by the known inner friction of the internal combustion engine (which is present, for example, in the form of a characteristic map of the operating range of the internal combustion engine), the desired inner effective actual torque $M_{INT\_EFF\_IST}$ is obtained. The influences of friction can be determined, for example, in the form of a friction torque $M_R$ by drag measurements of the internal combustion engine on the test stand 1 or by means of other suitable methods. Since the method of cylinder pressure indication is well known, it will not be discussed in more detail here. A detailed description can be found, for example, in EP 3 067 681 A1.

In general, the method according to the invention is not limited to specific drive units 2, but can be used for a wide variety of drive units 2, such as internal combustion engines, electric motors, a combination of electric and internal combustion engines (so-called hybrid drives), provided the required variables are available. The method can also be used, for example, in drive trains in which the mentioned drive units 2 can be connected to the connecting shaft 3 via a transmission, clutch, differential, semi-axles, etc.

Figure 2:
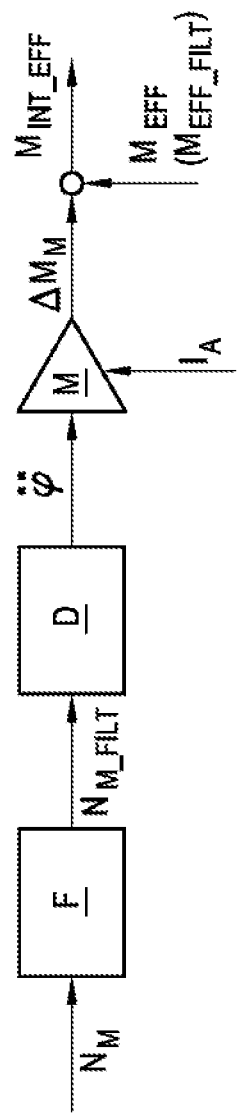
FIG. 2 shows the function of the observer

FIG. 2 uses a block diagram to show an example of a known simplified function of an observer 10 for determining the inner effective torque $M_{INT\_EFF}$ using the example of an internal combustion engine as the drive unit 2. An engine rotational speed $N_M$ is measured by the rotational speed measuring device 7 on the internal combustion engine and averaged by means of a filter F over a working cycle (for example 720° crank angle in 4-stroke engines) and the number of cylinders of the internal combustion engine. This averaging compensates for the non-uniform torque input during a working cycle of the internal combustion engine, which results from the combustion in the cylinder of the internal combustion engine and from the corresponding number of cylinders of the internal combustion engine and causes a change in the engine rotational speed $N_M$. For example, in a 4-stroke engine, combustion occurs in every cylinder every 720° crank angle, which generates a force on the piston and, as a result, a torque input on the crankshaft. With a 4-cylinder engine, this would mean, for example, a torque input every 180° crank angle, with a 6-cylinder engine, for example, 120° crank angle, etc. Because of the filtering of the engine rotational speed N described, a filtered engine rotational speed $N_{M\_FILT}$ is obtained. Analogously, such averaging or filtering can also be applied to the effective torque $M_{EFF}$, as a result of which a filtered effective torque $M_{EFF\_FILT}$ is obtained. The filtered engine rotational speed $N_{M\_FILT}$ is then derived with respect to time by means of a differentiator D, whereby an angular acceleration $\ddot{\varphi}$ is obtained.

In the next step, the angular acceleration $\ddot{\varphi}$ is multiplied in a multiplier M by the mass inertia $I_A$ of the internal combustion engine, which is assumed to be known, and a correction torque $\Delta M_M$ is obtained. The obtained correction torque $\Delta M_M$ and the filtered effective torque $M_{EFF\_FILT}$, which is for example again filtered over a working cycle and the number of cylinders of the internal combustion engine, are then added to an inner effective torque $M_{INT\_EFF}$ in a summation device S. Depending on the course of the engine rotational speed $N_M$ and the sign of the derived time derivative of the filtered engine rotational speed $N_{M\_FILT}$ or the angular acceleration $\ddot{\varphi}$, the measured effective torque $M_{EFF\_FILT}$ on the connecting shaft 3 which is averaged over a working cycle and the number of cylinders of the internal combustion engine is increased or reduced, whereby the dynamic influence of the mass inertia $I_A$ of the internal combustion engine is taken into account.

This calculation can be used both "online," using the observer 10, to determine the inner effective actual torque $M_{INT\_EFF\_IST}$, and "offline" or "online" to determine the inner effective desired torque $M_{INT\_EFF\_SOLL}$ from a given reference rotational speed/torque profile for performing the test run on the test stand 1. In this context, "online" means the determination of the inner effective actual torque $M_{INT\_EFF\_IST}$ at during a test run on a test stand 1 and "offline" means the determination of the inner effective desired torque $M_{INT\_EFF\_SOLL}$ outside of a test run on a test stand 1. However, it would also be possible to dispense with the filtering step in the "online" determination of the effective actual torque $M_{INT\_EFF\_IST}$, but a type of filtering would then substantially take place implicitly due to the characteristics of the controller used in the unit controlling unit 6 and the deceleration behavior of the drive unit 2.

In the case of a vehicle application of the internal combustion engine, the determination of the inner effective desired torque $M_{INT\_EFF\_SOLL}$ can be carried out, for example, from recorded measurement data from a real driving test (rotational speed/torque profile) or from other sources. The observer method described is of course not restricted to use in an internal combustion engine; it would also be applicable to other drive units 2, such as, for example, electric motors, hybrid drives, etc.

The mass inertia $I_A$ of the drive unit 2 can be assumed to be known. Different mass inertias $I_A$ can also be used to calculate the desired torque $M_{INT\_EFF\_SOLL}$. For example, the known mass inertia $I_A$ of the drive unit 2 can be used on the test stand 1. However, the mass inertia $I_A$ of the drive unit 2 from a reference run that is to be reproduced on the test stand can also be used. This means that the mass inertia $I_A$ of the drive unit 2 on the test stand 1 does not have to match the mass inertia of the drive unit with which the reference run was created or measured. For example, the internal power (power in the combustion chamber of an internal combustion engine as drive unit 2) of the test object will match well with the reference run. If a reference run is reproduced on the test stand and the actual mass inertia $I_A$ of the drive unit 2 is used on the test stand, then the power on the connecting shaft 3 will correctly match the reference run.

Figure 3C:
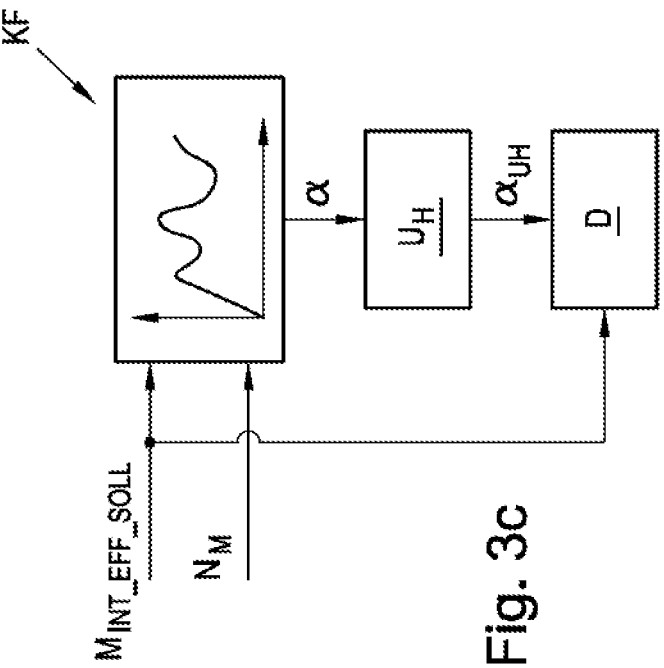
FIGS. 3a to 3c show method sequences according to the invention
Figure 3B:
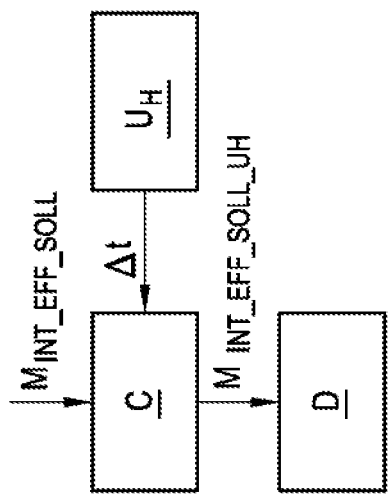
Figure 3A:
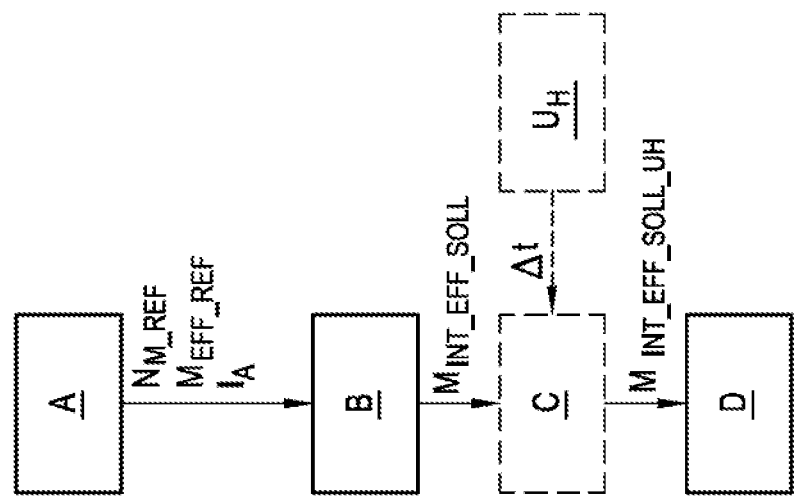

FIG. 3 shows the basic sequence of the method according to the invention using a flow diagram. In the first step, symbolized by block A, the generation or provision of courses for the rotational speed and the torque of the drive unit 2 to be reproduced in the test run to be carried out on the test stand 1 takes place. Reference values of the unit rotational speed $N_{A\_RF}$, the effective torque $M_{EFF\_REF}$, and the mass inertia $I_A$ of the drive unit 2 are required. This data can be provided, for example, by measurement data from real operation (reference run), but it can also be given by measurement cycles prescribed by law or originate from other sources.

In the next step, represented by block B, the inner effective desired torque $M_{INT\_EFF\_SOLL}$ is calculated from the given reference data using the same methodology that was already described with the aid of the observer 10 in FIG. 2 for determining the inner effective actual torque $M_{INT\_EFF\_IST}$. In the case of the drive unit 2 being an internal combustion engine, the reference engine rotational speed $N_{M\_REF}$ is preferably filtered over a working cycle and the number of cylinders of the internal combustion engine and derived in time, whereby a reference angular acceleration $\ddot{\varphi}_{REF}$ is obtained. Depending on the quality of the available reference data of the engine rotational speed $N_{M\_REF}$, the averaging over a working cycle and the number of cylinders can also be dispensed with, for example if such averaging has already taken place as part of the determination of the reference data or if the drive unit is designed as an electric motor with substantially uniform torque input over one revolution.

The reference angular acceleration $\ddot{\varphi}_{REF}$, is then multiplied by the known mass inertia $I_A$ of the drive unit 2 (for example $I_A$ of the internal combustion engine) to a reference correction torque $\Delta M_{M\_REF}$. Finally, the reference correction torque $\Delta M_{M\_REF}$ is added to the effective reference torque $M_{EFF\_REF}$ (in the case of an internal combustion engine with the effective reference torque $M_{EFF\_REF\_FILT}$ averaged over a working cycle and the number of cylinders of the internal combustion engine), from which the inner effective desired torque $M_{INT\_EFF\_SOLL}$ results, which can already be used to control the drive unit 2.

Again, depending on the quality of the available reference data, an averaging of the inner effective torque $M_{INT\_EFF\_SOLL}$ over a working cycle and the number of cylinders of the internal combustion engine can also be dispensed with, for example if such averaging has already taken place as part of the determination of the reference data or depending on the execution of the drive unit 2 (e.g. as an electric motor). If the required measurement data for such a procedure are not available, analog methods can be used to determine the inner effective desired torque $M_{INT\_EFF\_SOLL}$ from the available reference data.

For example, in the course of a driving test of a vehicle with a corresponding drive unit 2, the required torque for accelerating the vehicle mass could be calculated from a measured vehicle acceleration and the necessary inner effective torque $M_{INT\_EFF}$ can be calculated for this via known mass inertia, and can be used as an inner effective desired torque $M_{INT\_EFF\_SOLL}$. It would also be conceivable to determine the inner effective desired torque $M_{INT\_EFF\_SOLL}$ of a drive unit 2 from stored data of a unit control unit, such as an engine control unit (ECU) of an internal combustion engine. Alternatively, as described above, the values for the inner effective desired torque $M_{INT\_EFF\_SOLL}$ could also be determined from indicating data of the reference run.

The resulting inner effective desired torque $M_{INT\_EFF\_SOLL}$ can already be used directly to control the drive unit 2, for example the internal combustion engine on the test stand 1, which is symbolized by block D. For this purpose, the inner effective actual torque $M_{INT\_EFF\_IST}$ can be determined as described above during the test run, for example in the observer 10 or in the case of an internal combustion engine also by means of a cylinder pressure indicating system. The deviation between the inner effective desired torque $M_{INT\_EFF\_SOLL}$ and the inner effective actual torque $M_{INT\_EFF\_IST}$ can then be adjusted on the test stand 1 using a suitable controller, for example a simple PI controller.

However, the control can also use a given characteristic map KF for the manipulated variable in a feed forward control, for example accelerator pedal position α of an internal combustion engine over the engine rotational speed Nu and the effective torque $M_{EFF}$ or the inner effective torque $M_{INT\_EFF}$. For this purpose, a precontrol value of the manipulated variable, for example the accelerator pedal position α, is determined, for example, from the characteristic map KF from the effective torque $M_{EFF}$ (or the filtered effective torque $M_{EFF\_FILT}$) and the engine rotational speed $N_M$ (or generally the unit rotational speed $N_A$). The controller, preferably the unit controlling unit 6, to which the deviation between the inner effective desired torque $M_{INT\_EFF\_SOLL}$ and the inner effective actual torque $M_{INT\_EFF\_IST}$ is again fed, then determines a controller manipulated variable with which only minor deviations are then adjusted which result from inaccuracies of the characteristic map KF.

The manipulated variable for the drive unit 2 thus results in a known manner as the sum of the feed forward control manipulated variable and the controller manipulated variable. Such a characteristic map KF can be determined, for example, by stationary test stand measurements in various operating points in the relevant operating range of the drive unit 2. In an internal combustion engine, stationary operating points are set, for example, by means of the accelerator pedal position α and the engine rotational speed $N_M$, and the effective torque $M_{EFF}$ is measured on the connecting shaft 3 at the respective operating point and stored in a characteristic map KF. Due to the lack of dynamics of mass inertia, the effective torque $M_{EFF}$ corresponds to the inner effective torque $M_{INT\_EFF}$ during stationary operation. The obtained characteristic map KF is inverted, in order to obtain a characteristic map KF of the accelerator pedal position α, plotted against the inner effective torque $M_{INT\_EFF}$ and the engine rotational speed $N_M$.

In principle, any suitable controller can be used as the controller, which may also need to be parameterized in an application-specific and known manner and which is preferably implemented as hardware or software in the unit controlling unit 6.

According to a further embodiment of the method according to the invention, it is advantageous if the limited actuating dynamics of the drive unit 2 on the test stand 1 are taken into account when carrying out the test run. It is basically irrelevant here whether the test run is carried out with the inner effective torque $M_{INT\_EFF}$ or in a conventional manner with the effective torque $M_{EFF}$ which acts on the connecting shaft 3. If the inner effective torque $M_{INT\_EFF}$ is used, then this can be determined and used as described above. The effective torque $M_{EFF}$ can easily be measured on the connecting shaft 3. The consideration of the actuating dynamics is therefore basically independent of the use of the inner effective torque $M_{INT\_EFF}$ and can therefore be implemented independently of the torque used. In an advantageous embodiment, however, the test run is carried out with the inner effective torque $M_{INT\_EFF}$ and the actuating dynamics of the drive unit 2 are taken into account when carrying out the test run on the test stand 1 as described below.

A transfer function UF, which corrects the time behavior of the drive unit 2, is used to take the actuating dynamics into account when controlling the drive unit 2. The time behavior of the drive unit 2 substantially describes the temporal inertia of the controlled system (i.e. everything between setting the manipulated variable and the torque build-up) and maps the delayed torque build-up of the drive unit 2 to the manipulated variable. For example, the time between the setting of the accelerator pedal position α and the delayed increase (or decrease) in the inner effective torque $M_{INT\_EFF}$.

Because of its physical mode of operation, an electric motor generally has higher actuating dynamics than an internal combustion engine, which is why it is advantageous to take the actuating dynamics into account when carrying out the test run, particularly in the case of an internal combustion engine. This is substantially due to the fact that an internal combustion engine requires more time to implement a torque request due to the underlying physical processes, i.e. the time between the specification of the manipulated variable (e.g. accelerator pedal position α) and the actual torque build-up. An internal combustion engine with direct injection and exhaust gas turbocharging requires, for example, sufficient time for the boost pressure build-up, mixture formation, combustion, etc. In contrast, fewer physical processes are required in an electric motor, for example, substantially less time is required to build up a magnetic field.

In a simple embodiment, the transfer function UF can shift the values of the inner effective desired torque $M_{INT\_EFF\_SOLL}$ by a so-called dead time Δt on the time axis. Thus, an inner effective desired torque $M_{INT\_EFF\_SOLL\_UH}$ that has been shifted by the dead time Δt is obtained. This is symbolized in FIGS. 3a and 3a by block C, block C in FIG. 3a being optional, depending on whether a correction by means of transfer function UF is used or not. The corrected inner effective desired torque $M_{INT\_EFF\_SOLL\_UH}$ can be used as desired value for control (block D).

Alternatively, an associated, time-corrected manipulated variable, for example the accelerator pedal position α, can also be determined from the inner effective desired torque $M_{INT\_EFF\_SOLL}$ and the desired rotational speed $N_M$ using a transfer function UF. For this purpose, the manipulated variable can be determined, for example, via a characteristic map KF from the inner effective desired torque $M_{INT\_EFF\_SOLL}$ and the desired rotational speed $N_M$ and this manipulated variable can be shifted by the dead time Δt, as shown in FIG. 3c. The time-shifted manipulated variable $α_{UH}$ determined in this way can be used for the feed forward control in the control of the inner effective torque $M_{INT\_EFF}$, which is symbolized by block D.

In the simplest case, the dead time Δt can be a given or parameterized constant time value. Ideally, however, the dead time Δt is determined as a function of an operating point (torque/rotational speed) of the drive unit 2. For this purpose, the dead time Δt can be determined, for example, from characteristic maps in which the dead time Δt is plotted, for example depending on the unit rotational speed $N_M$ and the inner effective torque $M_{INT\_EFF}$ (Δt=f ($N_M$, $M_{INT\_EFF}$)) of the drive unit 2 or the effective torque $M_{EFF}$ (Δt=f ($N_M$, $M_{EFF}$)). Such characteristic maps can be determined, for example, by prior measurement of the drive unit 2 on a test stand 1 or approximately from empirical values or from the measurement of design-like reference drive units. Internal combustion engines of similar design can be, for example, internal combustion engines with comparable parameters, e.g. similar displacement, same number of cylinders, same supercharging concept, same mixture formation, etc.

When determining the dead time Δt by measuring the drive unit 2 beforehand on a test stand 1, a characteristic map for the increase in the torque of the drive unit 2 and a characteristic map for the decrease in the torque of the drive unit 2 are preferably determined in each case. Sudden changes in the manipulated variable, for example the accelerator pedal position α of the internal combustion engine or changes in the electrical current, in the form of short ramps, so-called a ramps in the internal combustion engine, are preferably given at selected operating points of the drive unit 2, and the dead time Δt is measured until delayed reaction of the inner effective torque $M_{INT\_EFF}$ or the effective torque $M_{EFF}$, which substantially represents a measure of the inertia of the torque build-up of the drive unit 2. This determination of the dead time Δt by means of ramps should be carried out both for the sudden increase and the sudden decrease in the inner effective torque $M_{INT\_EFF}$ or the effective torque $M_{EFF}$, which results in two dead time characteristic maps. The ramps should be chosen so steep that the drive unit 2 demands the maximum dynamics.

The dead time Δt for an operating point of the drive unit 2 can also be determined by analyzing the course of the inner effective torque $M_{INT\_EFF}$ or the effective torque $M_{EFF}$, for example, the dead time Δt can be dependent on the gradient of the course of the inner effective torque $M_{INT\_EFF}$ in the corresponding operating point. This method is preferably chosen when no separate measurements can be carried out on the drive unit 2 to determine the dead time Δt.

The transfer function UF can, however, also be configured in any other way, wherein the transfer function UF in the general case is a function of the inner effective torque $M_{INT\_EFF}$, i.e. $UF=f(M_{INT\_EFF})$. The transfer function UF is preferably a function of the operating point of the drive unit 2, i.e. $UF=f(N, M_{INT\_EFF}$ or $M_{EFF})$.

The given desired values of the inner effective torque $M_{INT\_EFF\_SOLL}$ are now corrected with the transfer function UF in order to take into account the time behavior of the drive unit 2 (the actuating dynamics), as will be explained below using the example of a dead time $\Delta t$ as the transfer function UF.

To carry out the test run, the given desired values are shifted by the dead time $\Delta t$, in particular shifted forward in time, and adjusted on the test stand 1 as described above to carry out the test run.

The resulting course of the given inner effective desired torque $M_{INT\_EFF\_SOLL}$ after the shift by the corresponding dead times $\Delta t$ can further be adapted such that all those data points are deleted which have larger absolute time values than their subsequent points. This creates a continuously increasing time vector. In the next step, the resulting course of the desired values should be brought to a common time base with the course of the reference unit rotational speed $N_{A\_REF}$ in order to be suitable for the control of the drive unit 2 symbolized by block D on the test stand 1.

Figure 4:
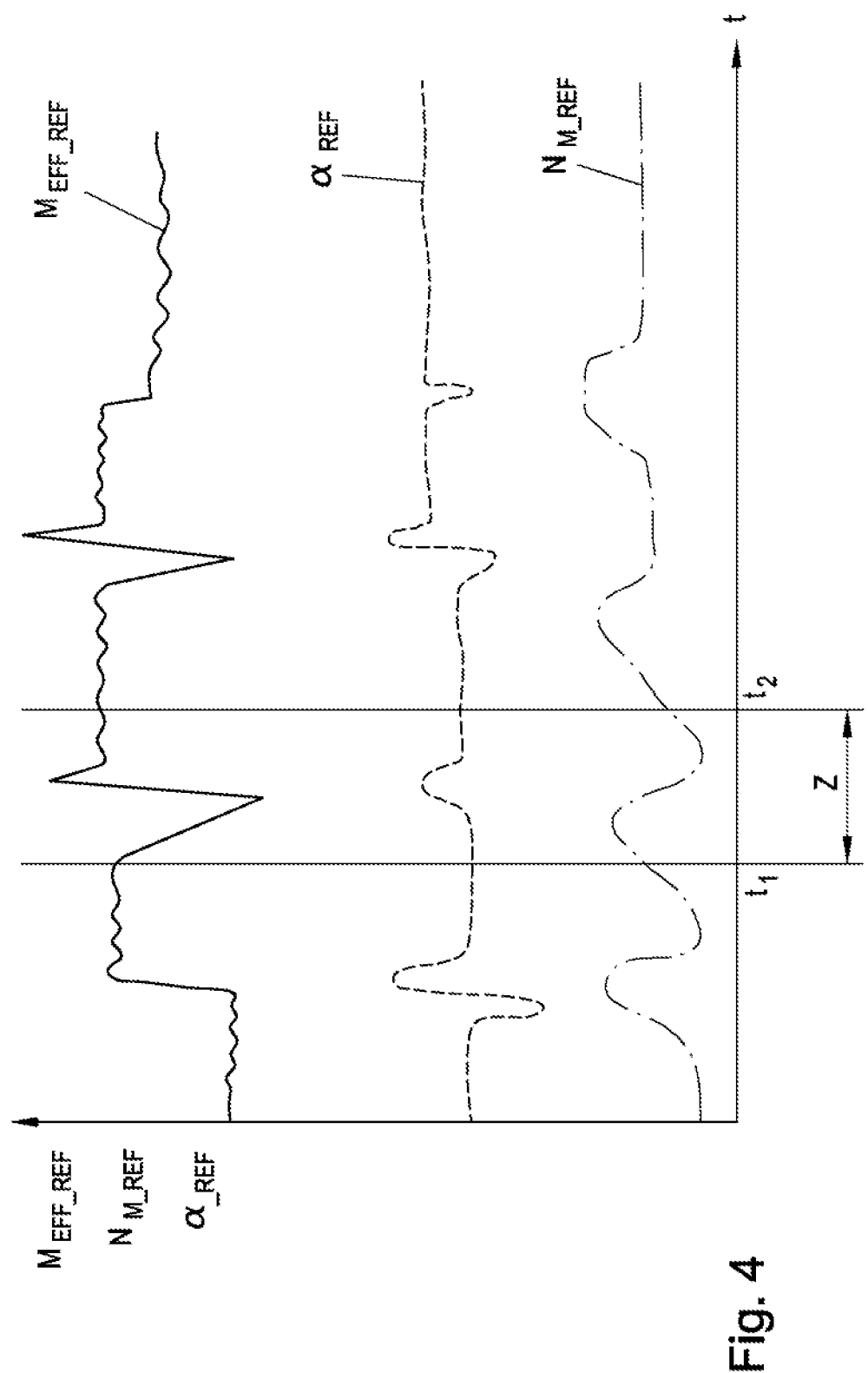
FIG. 4 shows a reference test run

FIG. 4 shows a diagram with measurements of a reference test run using the example of a drive unit 2 designed as an internal combustion engine, wherein the course of the reference values of the engine rotational speed $N_{M\_REF}$ is plotted as a dash-dotted line, the course of the reference values of the effective torque $M_{EFF\_REF}$ on the connecting shaft 3 is plotted as a solid line and the course of the reference values of the accelerator pedal position $\alpha_{\_REF}$ is plotted as a dashed line over the time t. The reference test run in the present example represents a drive with constant acceleration with three gear changes followed by a deceleration. On the basis of this reference test run, the improvements achieved in the method according to the invention are to be illustrated by way of example below. A reference test run can be carried out with the drive unit 2 to be examined or also with another reference drive unit. However, reference values could also come from other sources, for example from legally prescribed measuring cycles. For the purpose of a clearer representation, the following results are shown in the time period Z, which lies between the time t1 of the reference test run and the time t2 of the reference test run, as shown in FIG. 4.

Figure 5:
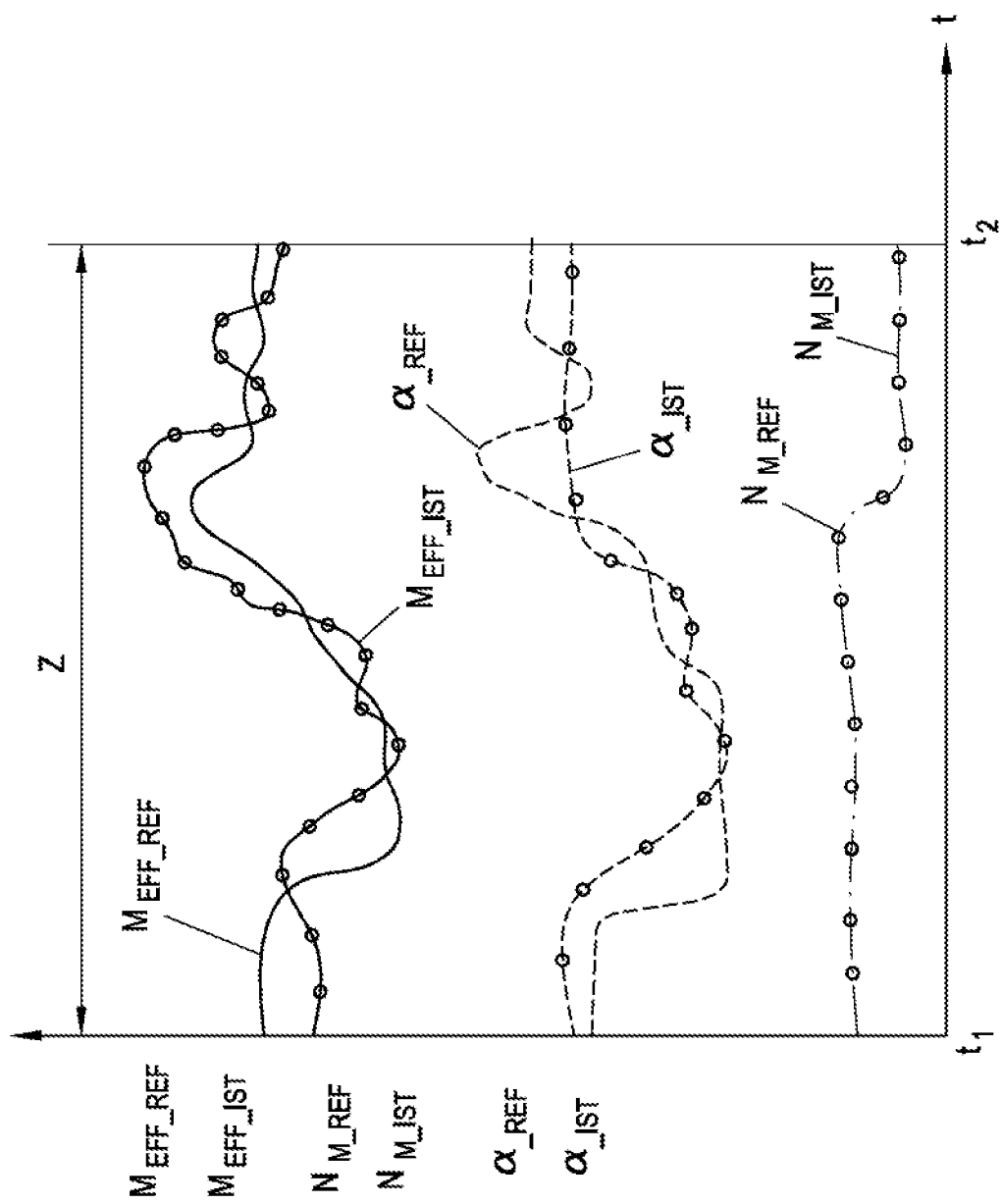
FIG. 5 shows results with the conventional control type $N/M_{EFF}$

FIG. 5 shows the results of a first test run in the time segment Z between the time 11 and the time t2 with the common control type $N/M_{EFF}$. The engine rotational speed $N_M$ is controlled by means of the control device 5 of the load machine 4 and the effective torque $M_{EFF}$ on the connecting shaft 3 is controlled by means of the unit controlling unit 6 via the manipulated variable of the accelerator pedal position $\alpha$. The courses of the measured actual values of the first test run are compared with the courses of the reference values of the reference test run known from FIG. 4. Again, the course of the reference values of the engine rotational speed $N_{M\_REF}$ is drawn as a dash-dotted line, the course of the reference values of the effective torque $M_{EFF\_REF}$ on the connecting shaft 3 is drawn as a solid line and the course of the reference values of the accelerator pedal position $\alpha_{\_REF}$ is drawn as a dashed line. The corresponding courses of the measured actual values $N_{M\_IST}$, $M_{EFF\_IST}$, and $\alpha_{\_IST}$ are each provided with a round marker. It can be seen that the engine rotational speed $N_M$ can be adjusted very precisely on the test stand 1, which can be attributed to a powerful load machine 4 with corresponding control characteristics. Furthermore, a relatively poor matching between the reference and actual courses of the effective torque $M_{EFF}$ and reference and actual profiles of the accelerator pedal position $\alpha$ can be seen. As described at the beginning, this is due to the strong coupling of engine rotational speed N and effective torque $M_{EFF}$ via the mass inertia $I_A$ of the internal combustion engine.

Figure 6:
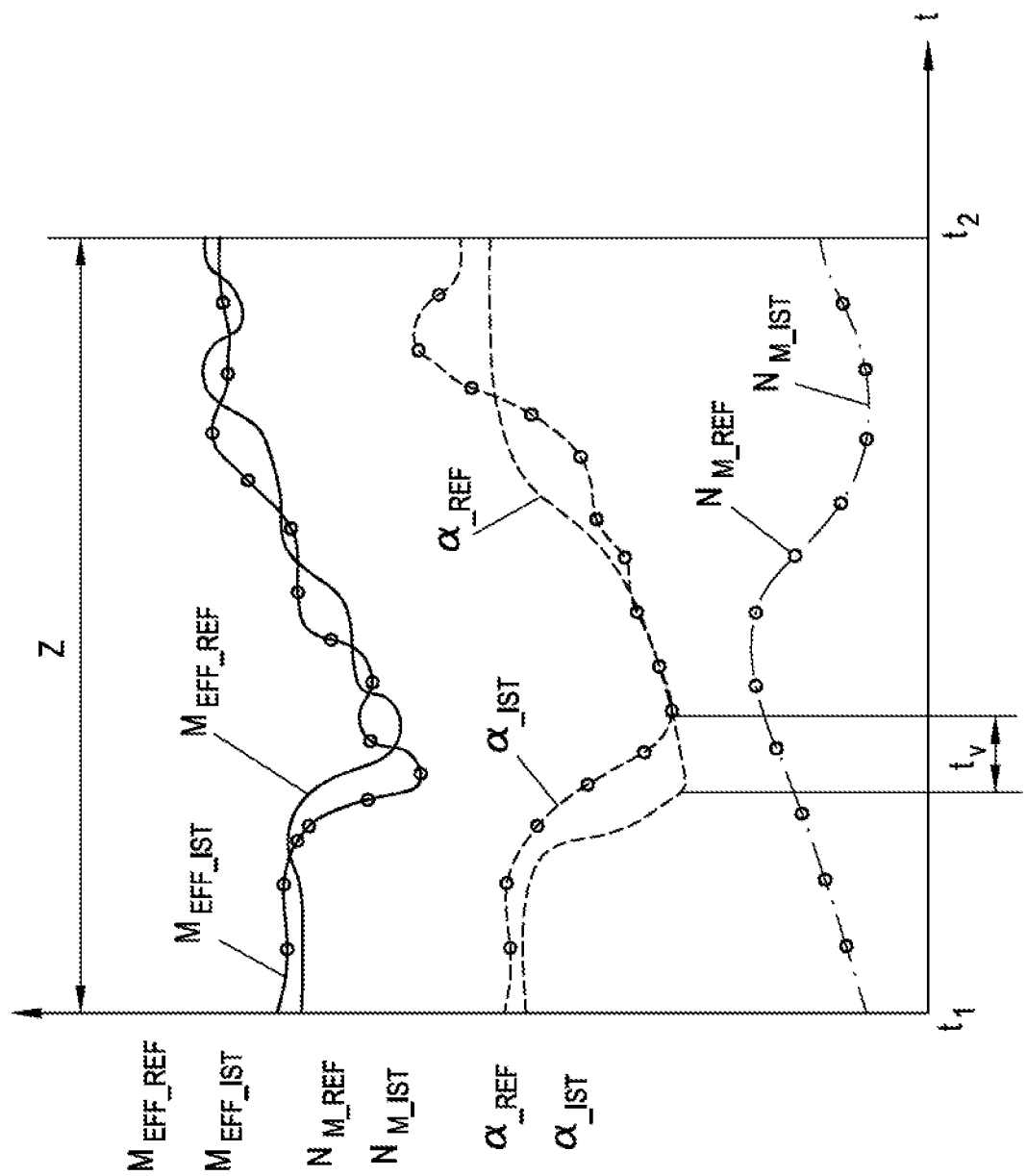
FIG. 6 shows results with control type N/$M_{INT\_EFF}$

FIG. 6 shows the results of a second test run in the time segment Z between the time t1 and the time t2 with the control type $N/M_{INT\_EFF}$ according to the invention. The engine rotational speed $N_M$ is controlled by means of the control device 5 of the load machine 4 and the effective inner torque $M_{INT\_EFF}$ is controlled by means of the unit controlling unit 6 via the manipulated variable of the accelerator pedal position $\alpha$. The courses of the measured actual values of the second test run are compared with the courses of the reference values of the reference test run known from FIG. 4. Again, the course of the reference values of the engine rotational speed $N_{M\_REF}$ is drawn as a dash-dotted line, the course of the reference values of the effective torque $M_{EFF\_REF}$ on the connecting shaft 3 is drawn as a solid line and the course of the reference values of the accelerator pedal position $\alpha_{\_REF}$ is drawn as a dashed line. The corresponding courses of the measured actual values $N_{M\_IST}$, $M_{EFF\_IST}$, and $\alpha_{\_IST}$ are each again provided with a round marker. It can be seen that there are better qualitative correspondences between the reference and actual courses of the effective torque $M_{EFF}$ on the connecting shaft 3 and the reference and actual courses of the accelerator pedal position $\alpha$, but also a time offset $t_v$ of the reference and actual courses is recognizable. This offset $t_v$ is mainly due to the described time behavior of the transfer function UF of the internal combustion engine, that is to say substantially the inertia of the torque build-up between the signal of the manipulated variable and the actually measurable torque build-up.

As described, it is advantageous if the time behavior of the transfer function UF of the internal combustion engine is taken into account by advancing the inner effective desired torque $M_{INT\_EFF\_SOLL}$ by the dead time $\Delta t$, as will be shown below with reference to FIG. 7.

Figure 7:
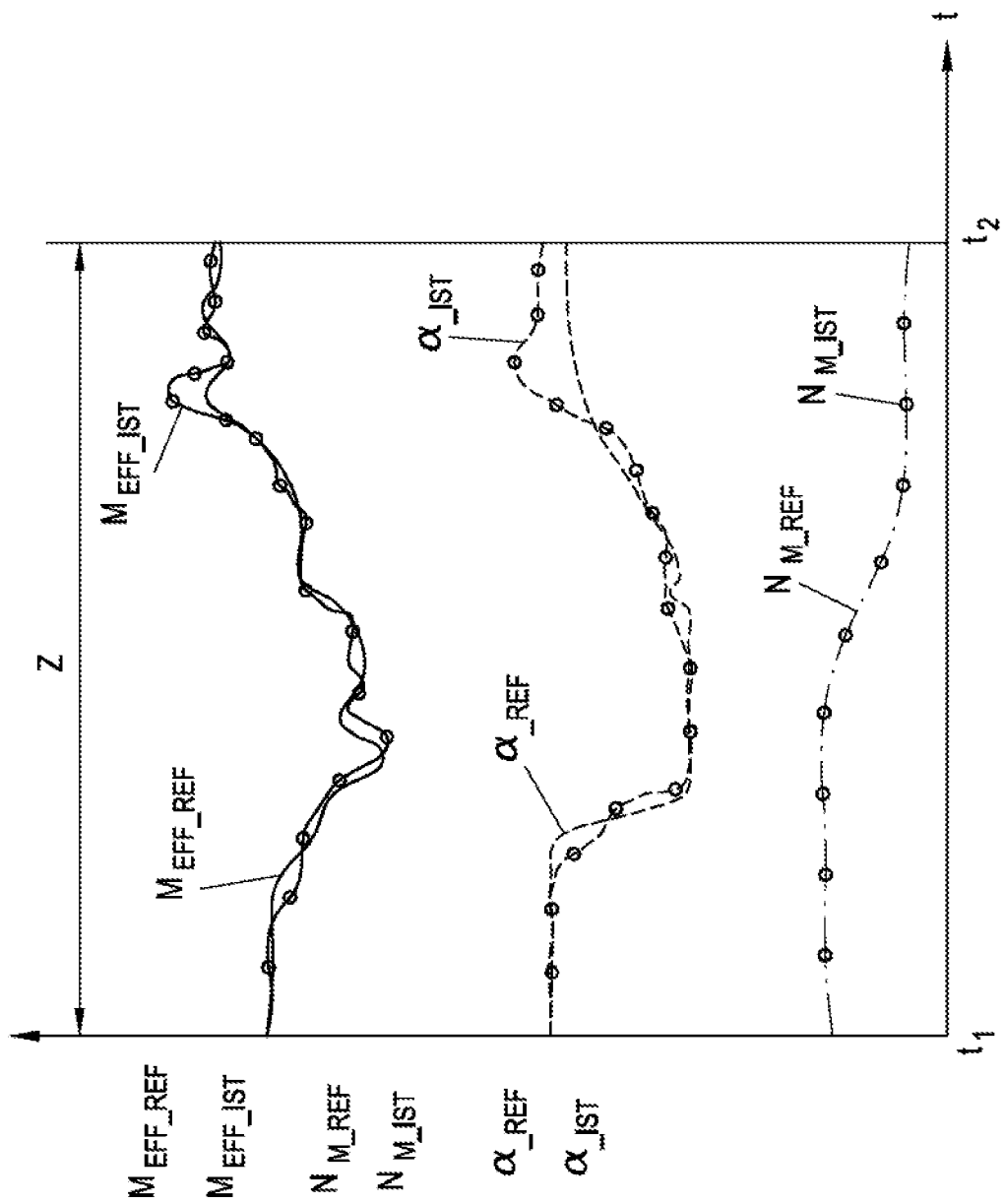
FIG. 7 shows results with control type N/$M_{INT\_EFF}$ with shifting the inner effective desired torque $M_{INT\_EFF\_SOLL}$ by a dead time $\Delta t$

FIG. 7 shows the results of a third test run in the time period Z between the time t1 and the time t2 with the control type $N/M_{INT\_EFF}$ according to the invention, wherein the inner effective desired torque $M_{INT\_EFF\_SOLL}$ is advanced by a constant dead time $\Delta t$ of 100 ms. The engine rotational speed $N_M$ is controlled by means of the control device 5 of the load machine 4 and the effective inner torque $M_{INT\_EFF}$ is controlled by means of the unit controlling unit 6 via the manipulated variable of the accelerator pedal position $\alpha$. The courses of the measured actual values of the third test run are compared with the courses of the reference values of the reference test run known from FIG. 4. Again, the course of the reference values of the engine rotational speed $N_{M\_REF}$ is drawn as a dash-dotted line, the course of the reference values of the effective torque $M_{EFF\_REF}$ on the connecting shaft 3 is drawn as a solid line and the course of the reference values of the accelerator pedal position $\alpha_{\_REF}$ is drawn as a dashed line. The corresponding courses of the measured actual values $N_{M\_IST}$, $M_{EFF\_IST}$, and $\alpha_{\_IST}$ are each again provided with a round marker. A clearly better correspondence between the courses of the reference and actual values of the effective torque $M_{EFF}$ and accelerator pedal position $\alpha$ can be seen. The exaggerations in the courses of the actual values of the effective torque $M_{EFF\_IST}$ and accelerator pedal position $\alpha_{\_IST}$ can be attributed in the present case, for example, to the fact that the used controller of the unit controlling unit 6 with the desired values (desired torque $M_{INT\_EFF\_SOLL}$) corrected by the dead time $\Delta t$, experiences a constant control deviation during the previous torque increase. As a result, the manipulated variable (accelerator pedal position $\alpha$) increases too much due to the integrative (I) component in the controller used. This increase can be avoided by changing the controller parameters.

Figure 8:
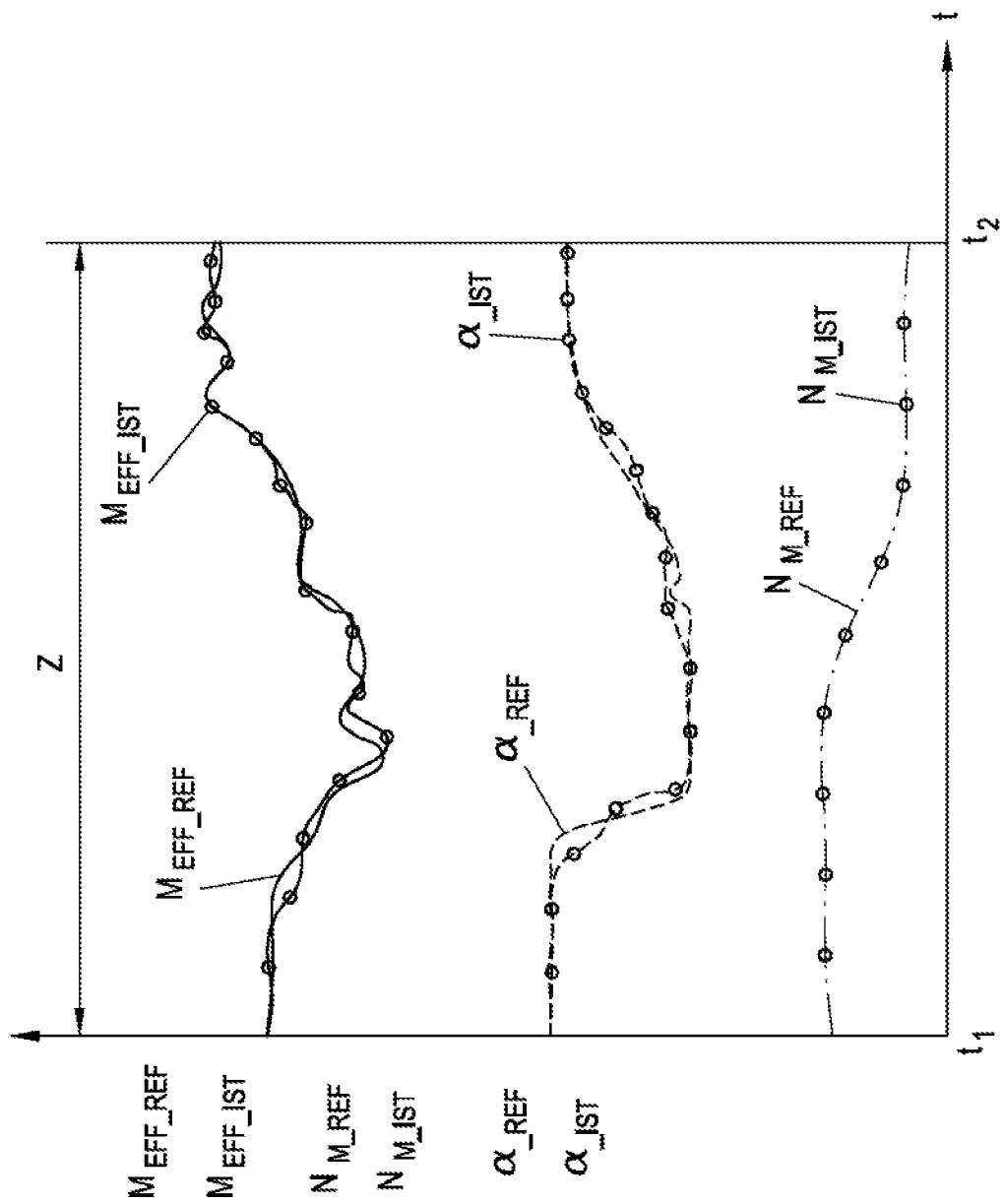
FIG. 8 shows results with control type N/$M_{INT\_EFF}$ when shifting the precontrol value of the accelerator pedal position $\alpha$ by a dead time $\Delta t$

However, this effect can also be avoided by using a feed forward control to control the inner effective torque $M_{INT\_EFF}$ and by applying the correction of the time behavior not to the inner effective desired torque $M_{INT\_EFF\_SOLL}$ but rather to a precontrol value of the manipulated variable of the feed forward control. For this purpose, for example, the precontrol value of the accelerator pedal position $\alpha$ is determined from the inner effective desired torque $M_{INT\_EFF\_SOLL}$ and the desired rotational speed N by means of a characteristic map KF. This precontrol value (accelerator pedal position $\alpha$) is then shifted by the dead time $\Delta t$. The inner effective torque $M_{INT\_EFF}$ is now controlled without correction of the inner effective desired torque $M_{INT\_EFF\_SOLL}$ by means of the unit controlling unit 6 (see FIG. 3c) and the precontrol value (accelerator pedal position $\alpha$) shifted by the dead time $\Delta t$ is added to the controller output of the controller of the unit controlling unit 6. The result is shown in FIG. 8 and it can be seen that substantially there are no exaggerations in the courses of the actual values of the effective torque $M_{EFF\_IST}$ and accelerator pedal position $\alpha_{\_IST}$. Alternatively, however, the inner effective desired torque $M_{INT\_EFF\_SOLL}$ could also be corrected and the precontrol value could be determined from the corrected inner effective desired torque $M_{INT\_EFF\_SOLL}$ and the desired rotational speed $N_M$ by means of a characteristic map KF.

According to a particularly advantageous embodiment of the invention, the inner effective torque $M_{INT\_EFF\_SOLL}$ is advanced by a dead time $\Delta t$, which is selected as a function of the operating points of the drive unit 2. Thereby, further improvements in the correspondence of the courses of the reference and actual values of the effective torque $M_{EFF}$ and accelerator pedal position $\alpha$ can be achieved. For this purpose, as already described, operating point-dependent characteristic maps can be created for the dead time $\Delta t$, which can be determined, for example, by measuring the drive unit 2 beforehand on a test stand 1, as has already been discussed with reference to FIG. 3.

If a previous measurement should not be possible, the dead time $\Delta t$ in an operating point of the drive unit 2 can also be determined, for example, as a function of the gradient of the course of the inner effective desired torque $M_{INT\_EFF\_SOLL}$ in the corresponding operating point. However, approximately a constant dead time $\Delta t$ can also be selected, as was described on the basis of the results of the third test run in FIG. 7. Of course, it is also possible to create characteristic maps for the dead time $\Delta t$ based on empirical values or based on the measurement of reference drive units. In this context, reference internal combustion engines can, for example, be internal combustion engines of a similar design, e.g. internal combustion engines with comparable parameters such as similar displacement, same number of cylinders, same supercharging concept, same mixture formation, etc. Even if the method according to the invention was described by way of example using measurements of an internal combustion engine, it should be noted at the point that the method is also suitable for other drive units 2, for example electric motors, hybrid drives, drive trains, etc.

The invention claimed is:

1. A method for performing a test run on a test stand including the following steps:
   providing a drive unit connected via a connecting shaft to a load machine;
   driving or loading the drive unit with the load machine;
   controlling the load machine by a control device on the test stand for carrying out the test run and
   controlling the drive unit by a unit controlling unit for carrying out the test run,
   reproducing given time courses of a rotational speed and a torque of the drive unit;
   controlling an inner effective torque of the drive unit by the unit controlling unit;
   determining an inner effective desired torque from the given courses of the rotational speed and the torque of the drive unit and a known mass inertia of the drive unit; and
   determining an inner effective actual torque during the operation of the drive unit on the test stand from measured values of the load machine and/or of the drive unit and/or of the connecting shaft and/or of a known mass inertia of the drive unit.

2. The method according to claim 1, wherein the step of determining the inner effective desired torque is determined from the given course of the rotational speed of the drive unit, the given course of the torque of the drive unit and from the known mass inertia of the drive unit by deriving the course of the given rotational speed with respect to time and multiplying by the known mass inertia of the drive unit, and adding the product to the given course of the torque of the drive unit.

3. The method according to claim 1, wherein the step of determining the inner effective actual torque is determined from an actual rotational speed measured on the load machine, or the drive unit, or the connecting shaft and from an effective actual torque measured on the load machine, or the drive unit, or the connecting shaft, and the known mass inertia of the drive unit.

4. The method according to claim 3, wherein the step of determining the inner effective actual torque is determined by deriving the actual rotational speed measured with respect to time and multiplying by the known mass inertia of the drive unit and adding the product to the measured effective actual torque.

5. The method according to claim 1, wherein the drive unit is an internal combustion engine and the step of determining the inner effective actual torque is determined by means of cylinder pressure indication of the internal combustion engine.

6. The method according to claim 5, wherein the step of determining the inner effective actual torque includes determining the difference between an indicated actual torque and a friction torque, wherein the indicated actual torque is determined by means of the cylinder pressure indication.

7. The method according to claim 1, wherein the step of controlling the drive unit includes using a feed forward control of a manipulated variable of the drive unit.

8. The method according to claim 7, wherein the manipulated variable is an accelerator pedal position.

9. The method according to claim 7, further including the step of determining precontrol values of the manipulated variable from a reference test run of the drive unit or a reference drive unit.

10. The method according to claim 9, wherein the step of determining the precontrol values are determined from the inner effective desired torque and a rotational speed.

11. The test stand according to claim 10, wherein the rotational speed is an actual rotational speed ($N_{Ist}$), or the given rotational speed.

12. The test stand according to claim 10, wherein the step of determining the precontrol values are determined by means of a characteristic map.

13. The method according to claim 1, wherein the step of controlling the drive unit further includes taking into account actuating dynamics of the drive unit by correcting desired values of control or precontrol values of a manipulated variable with a transfer function.

14. The method according to claim 13, characterized in that the desired values or the precontrol values of the manipulated variable are shifted by a dead time on a time axis using the transfer function.

15. The method according to claim 14, characterized in that the dead time is set to be the same for all operating points of the drive unit.

16. The method according to claim 14, characterized in that the dead time is determined depending on the operating point of the drive unit.

17. The method according to claim 16, characterized in that the dead time for the operating point of the drive unit is determined depending on a gradient of the course of the inner effective desired torque in the operating point.

18. The method according to claim 14, characterized in that the dead time is determined by measuring the drive unit or a reference drive unit on the test stand.

19. The method according to claim 18, characterized in that the dead time is further measured by suddenly changing the manipulated variable of the drive unit and measuring the time between the sudden change in the manipulated variable and a change in the inner effective actual torque caused thereby.

20. A test stand for performing a test run, the test stand comprising:
a drive unit connected to a load machine via a connecting shaft, the load machine configured and arranged for driving or loading the drive unit;
a control device configured and arranged to control the load machine on the test stand for carrying out the test run; and
a unit controlling unit configured and arranged to control the drive unit for carrying out the test run;
wherein the test stand is configured and arranged to carry out the test run in the form of given time courses of a rotational speed and a torque of the drive unit, characterized in that the unit controlling unit is further configured and arranged to control an inner effective torque of the drive unit;
wherein the unit controlling unit is further configured and arranged to determine
an inner effective desired torque from the given courses of the rotational speed and the torque of the drive unit and a known mass inertia of the drive unit, and
an inner effective actual torque during the operation of the drive unit on the test stand from measured values of the load machine, and/or of the drive unit, and/or of the connecting shaft, and/or of a known mass inertia of the drive unit.

21. The test stand according to claim 20, characterized in that the test stand further includes an observer in the form of hardware or software configured and arranged to determine the actual values of the inner effective torque.

22. The test stand according to claim 21 characterized in that the observer is further configured and arranged to determine the inner effective actual torque from an actual rotational speed measured on the load machine, or the drive unit, or the connecting shaft and an effective actual torque measured on the load machine, or the drive unit, or the connecting shaft, and the known mass inertia of the drive unit.

23. The test stand according to claim 20, wherein an internal combustion engine is the drive unit, and the test stand further including a cylinder pressure indication system configured and arranged for cylinder pressure indication of the internal combustion engine, wherein the inner effective actual torque is determined from the cylinder pressure indication.

24. The test stand according to claim 23, characterized in that the inner effective actual torque is determined from the difference between an indicated actual torque and a friction torque, wherein the indicated actual torque is determined by the cylinder pressure indication.

* * * * *